United States Patent
Desselle et al.

(10) Patent No.: US 8,082,439 B2
(45) Date of Patent: Dec. 20, 2011

(54) FIRMWARE MODIFICATION IN A COMPUTER SYSTEM ENVIRONMENT SUPPORTING OPERATIONAL STATE CHANGES

(75) Inventors: B. Dalvis Desselle, Spring, TX (US); William R. Jacobs, Houston, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 835 days.

(21) Appl. No.: 11/999,624

(22) Filed: Dec. 6, 2007

(65) Prior Publication Data

US 2009/0150662 A1   Jun. 11, 2009

(51) Int. Cl.
*G06F 9/00* (2006.01)
*G06F 9/24* (2006.01)
*G06F 15/177* (2006.01)
*G06F 9/44* (2006.01)

(52) U.S. Cl. .......... 713/100; 713/1; 713/2; 717/168

(58) Field of Classification Search .......... 713/1, 2, 713/100; 717/168
See application file for complete search history.

(56) References Cited

U.S. PATENT DOCUMENTS

| | | | |
|---|---|---|---|
| 6,594,723 B1* | 7/2003 | Chapman et al. | 711/103 |
| 6,678,831 B1* | 1/2004 | Mustafa et al. | 713/320 |
| 6,986,069 B2* | 1/2006 | Oehler et al. | 713/320 |
| 7,136,994 B2* | 11/2006 | Zimmer et al. | 713/2 |
| 7,814,479 B2* | 10/2010 | Douglas et al. | 717/173 |
| 2003/0041271 A1* | 2/2003 | Nalawadi et al. | 713/300 |
| 2005/0223291 A1* | 10/2005 | Zimmer et al. | 714/34 |
| 2006/0143600 A1* | 6/2006 | Cottrell et al. | 717/168 |
| 2007/0174601 A1* | 7/2007 | Douglas et al. | 713/1 |
| 2010/0268867 A1* | 10/2010 | Gyl et al. | 711/103 |

* cited by examiner

*Primary Examiner* — Ji H Bae

(57) ABSTRACT

A method of modifying a computer system firmware includes initiating a firmware modification. At least one prohibited pre-determined operational state is inhibited to prevent the computer system from entering the at least one pre-determined operational state until a subsequent boot. The firmware is modified.

21 Claims, 12 Drawing Sheets

FIRMWARE MODIFICATION IN A COMPUTER SYSTEM ENVIRONMENT SUPPORTING OPERATIONAL STATE CHANGES

BACKGROUND

Computer systems include firmware to provide an interface between the operating system and hardware such as peripheral devices. The firmware is stored in a nonvolatile memory. The firmware for some computer systems includes a Basic Input/Output System (BIOS).

The BIOS includes instructions enabling a processor to identify, initialize, and test components such as peripheral devices of the computer system during the boot process. The devices may be accessed or controlled with BIOS function calls. The BIOS includes tables that may be used to identify the devices and how to communicate with them. The BIOS includes instructions defining some computer system events as well as instructions for how to respond to such events.

In order to resolve latent errors in the firmware, fix inadvertent corruption of the firmware, support additional hardware, or support new features, a firmware modification process can be used to change the BIOS. Various techniques exist for changing the BIOS. After the modification, the user is prompted to reboot the computer to ensure all data structures and function calls, context, etc. are based upon the structures and definitions set forth in the modified firmware rather than the prior version of the firmware.

A number of problems may arise if the user does not timely initiate the reboot. For example, many systems have power management policies that force the computer system to enter into power conservation states based upon varying triggers such as periods of inactivity. The computer may not be able to properly enter into or recover from a power conservation state until after a reboot. If the computer saves context compatible with one version of the firmware and then attempts to restore the context after the firmware is modified, the computer may experience erratic and even harmful behavior. Some applications use a BIOS measurement or firmware metric determined upon boot for security purposes. These metrics and measurements calculated at boot will not reflect the values representing the modified firmware until the next boot. Failure to timely boot again such that these measurements or metrics are re-calculated may expose the computer system to the risk of a security breach.

SUMMARY

One embodiment of a method of modifying a computer system firmware includes initiating a firmware modification. At least one prohibited pre-determined operational state is inhibited to prevent the computer system from transitioning to the pre-determined operational state until a subsequent boot. Modification of the firmware proceeds.

Another embodiment of a method of modifying a computer system firmware includes initiating a firmware modification of the computer system. An inhibit flag representing at least one prohibited pre-determined operational state is set. Modification of the firmware proceeds.

Another embodiment of a method of modifying a computer system firmware includes initiating a firmware modification of the computer system. A power management table is modified to prohibit operating system requests to enter at least one prohibited pre-determined operational state. Modification of the firmware proceeds.

Another embodiment of a method of modifying a computer system firmware includes initiating a firmware modification of the computer system. An inhibit flag representing at least one prohibited pre-determined operational state is set. A power management table is modified to prevent operating system requests to enter the at least one prohibited pre-determined operational state. Modification of the firmware proceeds.

One embodiment of a method of modifying a computer system firmware includes initiating a firmware modification. A request to enter a pre-determined operational state is received. The request is complied with if and only if the pre-determined operational state is not prohibited due to a firmware modification.

Another method of modifying a computer system firmware includes receiving a request to transition the computer system to a pre-determined operational state. The request is executed if and only if an inhibit flag corresponding to the pre-determined operational state is clear.

BRIEF DESCRIPTION OF THE DRAWINGS

Embodiments of the present invention are illustrated by way of example and not limitation in the figures of the accompanying drawings, in which like references indicate similar elements and in which.

DETAILED DESCRIPTION

Figure 1:
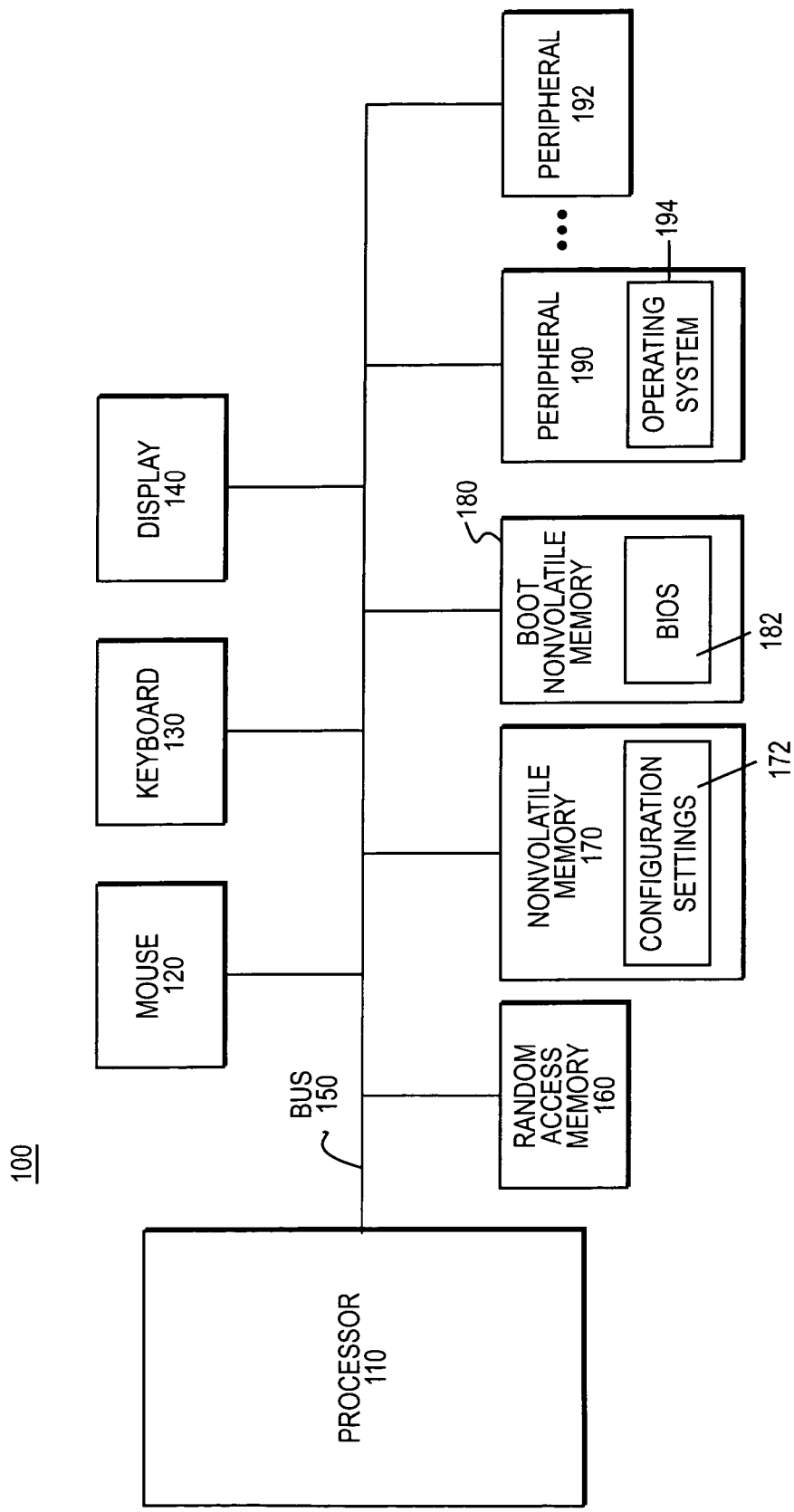
FIG. 1 illustrates one embodiment of a computer system.

FIG. 1 illustrates one embodiment of a computer system architecture. Computer 100 includes processor 110. Input devices such as mouse 120 and keyboard 130 permit the user to input data to client computer 100. Information generated by the processor is provided to an output device such as display 140. Computer 100 includes random access memory (RAM) 160 used by the processor during program execution.

RAM 160 is typically a volatile memory and does not retain its contents once power is removed from the computer system. Computer 100 includes nonvolatile memory 170 for storing configuration settings 172 even when the computer is powered down. Often parameter information that identifies specific features of the input/output devices is stored in nonvolatile memory 170. For example, parameter information might describe the number of disk drives, disk drive type, number of heads, tracks, amount of system RAM, etc. as well as the sequence in which peripherals are accessed when attempting to boot the computer (peripheral boot sequence). Typically, nonvolatile memory 170 is a semiconductor-based memory. Various types of nonvolatile media including electrically erasable programmable read only memory (EEPROM), flash electrically re-writable memory, and battery-backed complementary metal oxide semiconductor (CMOS) are available.

The computer also has one or more peripherals 190, 192 such as a floppy drive, a hard drive, or an optical drive that supports nonvolatile storage. Compact disks (CDs) and Digital Video Disks (DVDs) are examples of media used with optical drives.

Mouse 120, keyboard 130, display 140, RAM 160, nonvolatile memory 170, and boot nonvolatile memory 180 are communicatively coupled to processor 110 through one or more buses such as bus 150.

Initialization of the computer system is performed upon power-up of the computer system or hardware or software reset operations. In one approach, the processor is designed to read a pre-determined memory location when the processor is reset or powered up. The pre-determined memory location stores a pointer or an address that directs the processor to the beginning of the bootstrap routines. The pointer or address is referred to as a boot vector. For some types of resets (e.g., a "hard" or "cold" reset), the boot vector is always set to a value determined at the time of manufacture of the processor. Other types of resets (e.g., "soft" or "warm" reset) permit an alternative boot vector to be used. A reset is also called a boot or re-boot.

For hard resets, the boot vector typically points to an address in the boot nonvolatile memory 180. For soft resets, however, the boot vector may point to an address in the boot nonvolatile memory or a RAM location. The boot nonvolatile memory stores the bootstrap loader and typically stores other initialization routines such as power on system test (POST). Although occasionally referred to as a boot read only memory (ROM), the boot nonvolatile memory is typically embodied at least partially as a re-writable nonvolatile memory to permit updates. For example, in one embodiment the boot nonvolatile memory comprises a semiconductor flash electrically re-writable memory.

The boot nonvolatile memory may include routines for communicating with input/output devices in the computer system. In some computer systems these routines are collectively referred to as the Basic Input Output System (BIOS) 182. The BIOS provides a common interface so that software executing on the processor can communicate with input/output devices such as the keyboard, mouse, nonvolatile mass memory storage device, and other peripheral devices.

The BIOS is the interface between the operating system and the hardware of the computer system. Various parameters for the BIOS can typically be modified through the use of a BIOS configuration program at or near the time of a cold boot. The BIOS itself may be modified through the use of a firmware modification program.

After modification of the BIOS, the computer system must be reset to ensure integrity of operation. In one embodiment, power is removed and then reapplied to the computer system via a mechanical on/off switch to effect a power-up boot. Alternatively, the computer system is transitioned to another operational state from which a boot will be initiated with the appropriate initialization sequence.

Firmware modification programs typically prompt the user to boot the computer after the modification. Processes that interrupt the firmware modification or inhibit the user from booting the computer may cause the computer system to lock-up or otherwise operate erratically. Such processes should be inhibited until after a boot.

An example of a process that may interfere with the firmware modification or subsequent boot is a computer system power management process. Current computer systems implement various power management features that may interfere with the firmware modification process. One power management specification, the Advanced Configuration and Power Interface (ACPI) specification, is an open industry specification. The ACPI specification establishes industry standards for computer operating system-directed configuration and power management (see, e.g., *Advanced Configuration and Power Interface Specification Rev. 3.0b*, Hewlett Packard Corporation, Intel Corporation, Microsoft Corporation, Phoenix Technologies Ltd., and Toshiba Corporation, (Oct. 10, 2006)).

Power management ranges from placing individual components into specific power conservation modes to placing the system as a whole into a pre-determined operational state. These states are often referred to "sleep" states. Exiting sleep states and returning to a working state entails "waking" the individual components or the system as a whole as the case may be. Power management generally entails transitioning individual components between power conservation modes or the system as a whole between a working state and various sleep states based upon observations of the system. The sleep states consume different amounts of power and have different exit latencies.

Figure 2:
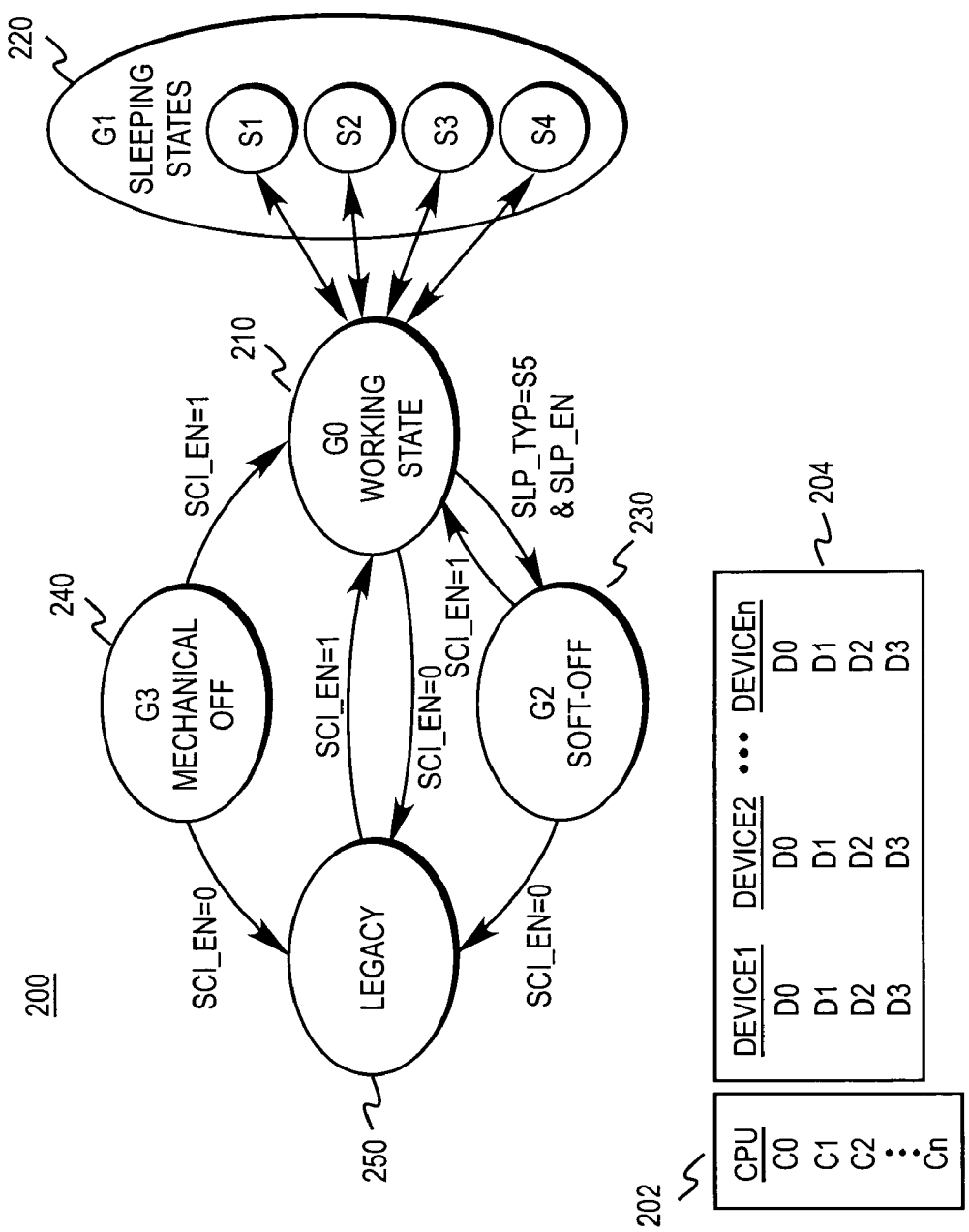
FIG. 2 illustrates one embodiment of power management states.

FIG. 2 illustrates one embodiment of a power management state diagram as described by the ACPI specification. Each of these states and sub-states represents an identifiable operational state of the computer system. Tables 202 and 204 illustrate that individual components such as devices and the central processing unit (CPU) may have several power conservation modes C1-Cn, D0-D3, etc.

Generally, global state transitions are accomplished by setting register values corresponding to a power management enable flag (e.g., SCI_EN). The G0 "Working" state is the normal operating environment of an ACPI machine. In this state different devices are dynamically transitioning between their respective power states (D0, D1, D2 or D3) and processors are dynamically transitioning between their respective power states (C0, C1, C2 or C3).

The working state is also known as the G0 state 210. From the G0 state, the system can be placed in a low power "soft-off" state indicated by the G2 state 230. The G0 state may alternately transition to the legacy state 250 (i.e., no power management). The G3 state 240 is a mechanical off state.

From the G0 state, operating system power management (OSPM) can make a policy decision to place the platform into the system G1 220 "sleeping" state. The hardware can provide up to four system sleeping states that have different power and exit latencies represented by the S1, S2, S3, or S4 sub-states of the G1 220 sleeping state. (Another sleep state S5 is technically part of the G2 state rather than the G1 state). Generally, a sleep state is designated by the operating system by setting a value for a sleep type variable (SLP_TYP) and then setting a sleep enable flag (SLP_EN).

The S1 sleep state is a low wake latency sleep state. No system context is lost and hardware maintains all system context including processor and chip set context. The S2 sleep state is a low wake latency sleep state. Unlike S1, the processor and system cache context are lost. Control starts from the processor's reset vector after a wake event.

The S3 sleep state is a low wake latency sleep state. All system context except system memory is lost. Processor, chip set, and cache context are lost for example. Hardware maintains memory context and is responsible for restoring chip set, processor, and cache context upon waking. Control starts from the processor's reset vector after the wake event. The S3 sleep state is referred to as the "standby" sleep state in some systems.

The S4 sleep state is the longest wake latency sleep state. This is also called the "hibernate" state in some systems. Platform context is saved to a file and then restored in response to a wake event.

Although there is an S5 state, such a state is not a sleep state. The S5 state may be initiated by the operating system however. The S5 state is similar to the S4 sleep state except that there is no restoration of platform context upon waking from an S5 state. The S5 state is not a true power-off mode. Transitions from an S5 state may be treated as a power-up boot because the platform context is not being restored.

When OSPM decides to enter a sleeping state it picks the most appropriate sleeping state supported by the hardware. Once in a sleep state, the computer system must exit to a state such as working state G0 rather than transitioning to another sleep state. There is no direct transitioning between sleep states (e.g., S1 to S4). The user's operating environment is maintained during transitions between the working state G0 and sleeping state G1.

Figure 3:
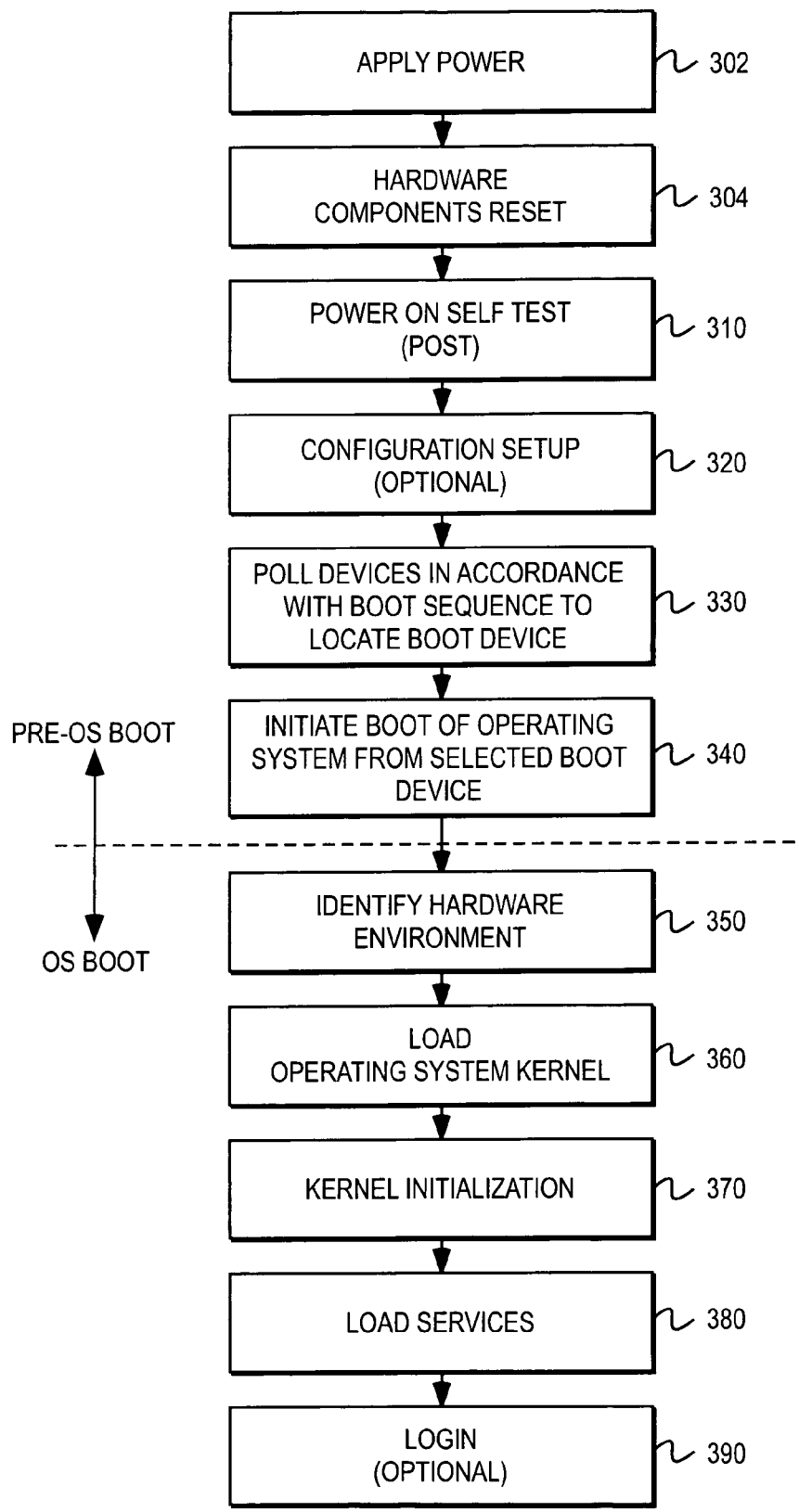
FIG. 3 illustrates one embodiment of computer system boot process.

Waking from a sleep state may entail booting the BIOS, the operating system, or both. Such a boot is not equivalent to a power-up cold boot because the machine context at the time of entering the sleep state may be restored after the boot. In addition, the POST process and hardware reset blocks of FIG. 3 are usually side-stepped. The system is presumed to be the same as it was prior to entering the sleep state.

These assumptions are problematic in a secure environment. For example, some computer systems provide for "measuring" the BIOS to determine if it has changed for security purposes. Such measurements or changes are reported to the operating system to aid in the detection of unauthorized system changes. If the firmware is modified without subsequently booting, the computer system will fail to recognize that the BIOS now has a different measurement than what was reported upon the boot preceding the modification. In particular, the wrong measurement will be reported or the change will not be detected.

Another problem is that deeper sleep states (e.g., S4 "hibernate") save the system context to a file based upon the version of BIOS stored in system memory at the time of entering the sleep state. The BIOS reloaded into system memory after a firmware modification will be different from that at the time of entering the sleep state. An attempt to restore the system state from a file associated with a state preserved by a prior version of the BIOS may result in anomalous behavior. The computer system may not be able to recover from the sleep state. The computer system might behave erratically after recovery. Thus there are at least some sleep states that the computer system should be prohibited from entering into during or after firmware modification until a subsequent boot is performed. An examination of the computer system boot process may be helpful in explaining methods for inhibiting pre-determined operational states during or after a firmware modification.

FIG. 3 illustrates one embodiment of a computer boot method when the computer is booted from a power off state. A power-up boot includes the removal and then application of power at 302. Upon application of power much of the computer system hardware including the processor resets itself at 304. Upon initialization, the processor starts executing the BIOS code stored in the boot nonvolatile memory. The BIOS includes instructions for performing a Power On Self Test (POST) as indicated at 310. The POST initializes the system memory, processor cache, and controllers including bus controllers, graphics controllers, hard drive controllers, and other input/output controllers.

After a successful POST, a window of opportunity for optionally invoking a pre-OS boot BIOS configuration program is available at 320. Unless the user issues a keyboard key sequence during this window of opportunity to launch the configuration program, the computer will proceed to boot the operating system. The specific key sequence for the configuration program is dependent upon the vendor of the computer's BIOS. Common key sequences include the DEL key, SHIFT-DEL key combination, F-10 key, etc.

The BIOS polls peripheral devices in accordance with a peripheral device boot sequence to locate a boot device at 330. An operating system boot from the boot device is initiated at 340. The selected boot device is the first peripheral device in the peripheral device boot sequence that has a valid boot sector indicative of the presence of an operating system. The BIOS transfers control to code located within the boot sector of the selected boot device. The boot sector code is operating system- and file system-specific. The BIOS, however, is still used to access the boot device. Steps 310-340 are referred to as a "pre-OS" boot phase.

The computer system hardware environment is detected at 350. Information regarding the computer architecture is collected. The operating system kernel is loaded at 360. The kernel is initialized at 370 using the information gathered at 350. Different peripherals, for example, may require distinct drivers to communicate with the operating system. The information gathered at 350 aids in the determination of the appropriate drivers to be used by the kernel. Various services utilized by the operating system (e.g., user authorization) may be loaded at 380. The computer then optionally provides a login authorization at 390 before permitting access by users. Typically, the operating system is considered to have successfully booted once the user is able to successfully perform a login.

Blocks 350-390 are referred to as the "OS boot" phase of the boot process. Blocks 350-390 are intended to represent a generic operating system boot process. The process may vary depending upon the specifics of the operating system being loaded. For example, some operating systems may be deemed successfully booted prior to a successful user login.

Figure 4:
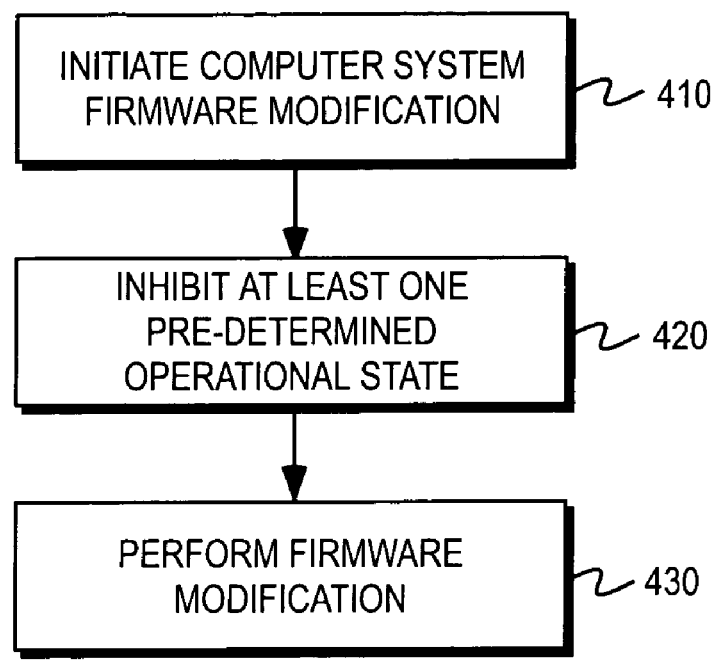
FIG. 4 illustrates one embodiment of a method of modifying firmware.

FIG. 4 illustrates one embodiment of a method of performing a firmware modification. A computer system firmware modification is initiated at 410. At least one prohibited pre-determined operational state is inhibited at 420. The firmware modification is performed at 430.

Generally any operational state from which restoration to the working state includes preservation of cache, memory content, or processor context is a prohibited operational state. The computer system may be placed into any state from which a transition to a working state requires a firmware boot that will not restore cache, memory, or processor context. Referring to FIG. 2, for example, global sleep state G1 or selected sub-states within G1 may be prohibited while states G2 and G3 are not prohibited in one embodiment.

Various approaches may be used to inhibit pre-determined operational states that should be prohibited until a subsequent boot. The firmware may maintain flags identifying prohibited operational states. The operating system can be messaged to inhibit operating system requests for prohibited operational states. The code for the prohibited operational states may be made inaccessible. Alternatively, the hardware may be configured to prevent entry into some operational states.

Figure 5:
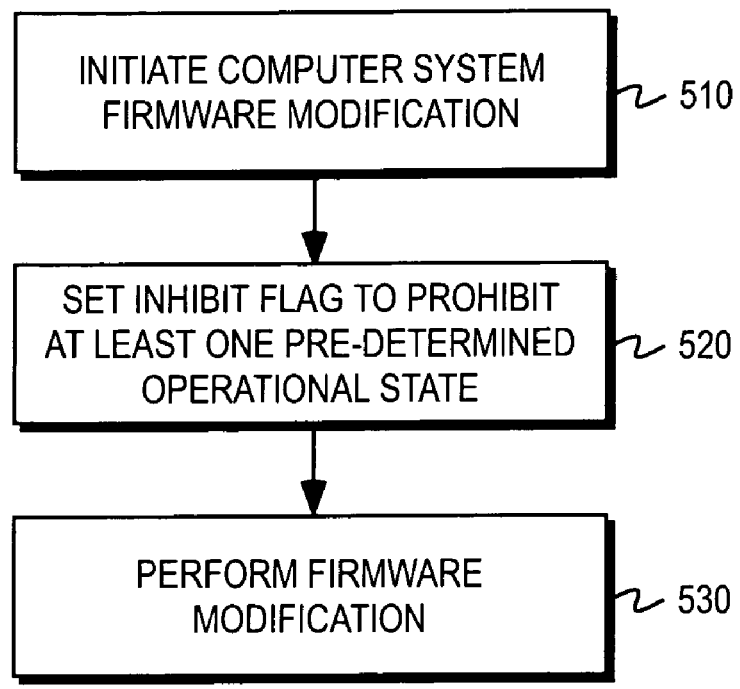
FIG. 5 illustrates another embodiment of a method of modifying firmware including setting an inhibit flag to prohibit at least one pre-determined operational state.

FIG. 5 illustrates one embodiment of a method to inhibit entering pre-determined operational states prior to a computer system boot after firmware modification. A computer system firmware modification is initiated at 510. An inhibit flag is set to prohibit at least one pre-determined operational state at 520. The firmware modification is performed at 530.

The inhibit flag indicates that at least one pre-determined operational states are prohibited. In one embodiment, the inhibit flag is stored in nonvolatile memory such as the same physical memory that the firmware is stored within. In another embodiment, the inhibit flag is stored in a computer system register. The register, for example, may be located within the processor or within an I/O controller associated with communicating between the processor and the firmware nonvolatile memory. The flag may specifically identify one or more operational states or simply be defined to represent a specified group of operational states. In one embodiment, the inhibit flag represents a group of power management states including S3 and S4 as defined by the ACPI specification.

Figure 6:
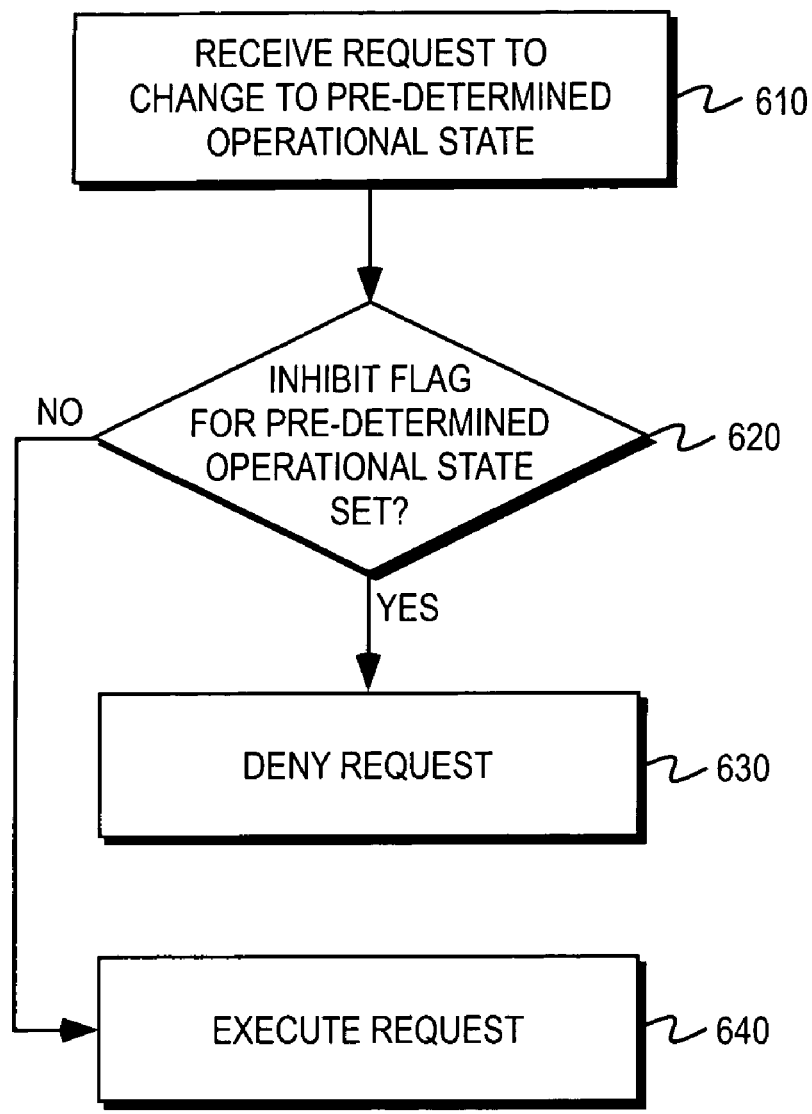
FIG. 6 illustrates one embodiment of a method of responding to a computer system request to transition to a prohibited pre-determined operational state.

FIG. 6 illustrates one embodiment of a method of responding to a computer system request to transition to a prohibited pre-determined operational state. The request is executed if and only if an inhibit flag corresponding to the pre-determined operational state is clear. For example, a request to enter a pre-determined operational state is received at 610. A determination is made as to whether an inhibit flag for the pre-determined operational state is set at 620. If not, then the request is executed at 640. If the inhibit flag is set, the request is denied at 630.

The method of FIG. 5 in conjunction with the method of FIG. 6 prevents the firmware from fulfilling requests made upon the firmware to place the computer system into one of the prohibited pre-determined states. In more recent computer system designs, the operating system also plays a role in controlling or initiating a transition into one of the pre-determined operational states. Thus steps may be taken to prevent the operating system from attempting to initiate a transition to one of the prohibited operational states.

Figure 7:
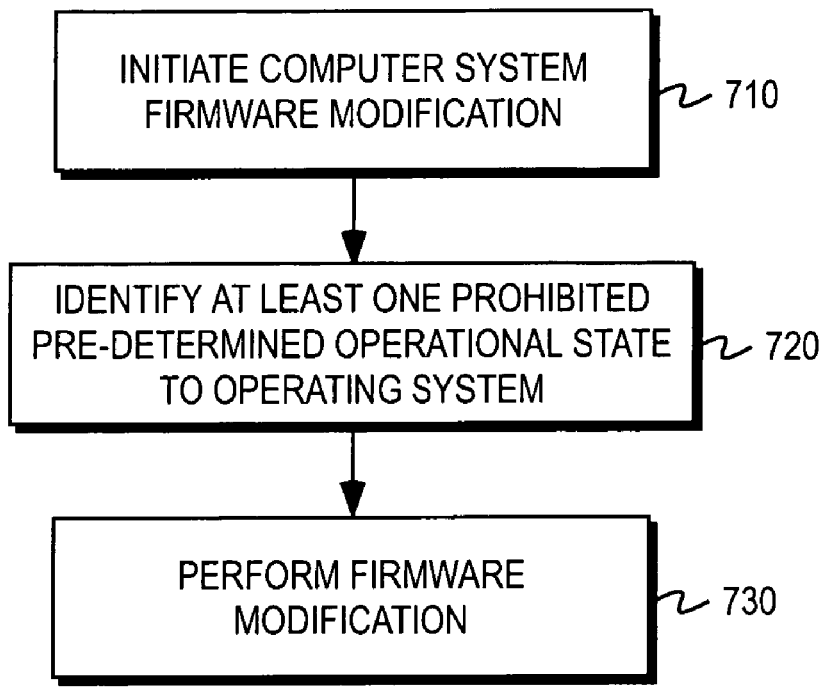
FIG. 7 illustrates one embodiment of a method of modifying firmware including identifying at least one prohibited pre-determined operational state to the operating system.

FIG. 7 illustrates one embodiment of a method of modifying firmware including identifying at least one prohibited pre-determined operational state to the operating system. A computer system firmware modification is initiated at 710. At least one prohibited pre-determined operational state is identified to the operating system at 720. The firmware may accomplish this, for example, by storing the identity of the prohibited operational state at a location accessible to the operating system. Alternatively, a "prohibited operational state" message may be communicated to the operating system to identify the prohibited operational states. The firmware modification is performed at 730.

One disadvantage of the approach of FIG. 7 is that co-operation from the operating system is required. In particular, the operating system must observe the list of prohibited operational states.

Instead of providing the operating system with a list of prohibited operational states, the prohibited states may be removed from the list of possible operational states. ACPI-compliant hardware has features to permit the operating system to co-ordinate power management operations such as disk drive spin down and display power down. The features of ACPI-compliant hardware are controlled through ACPI Software Language (ASL) control methods compiled into ACPI Machine Language (AML 184) code that is stored as part of the system BIOS. The ASL/AML control methods are interpreted and executed by a driver within the ACPI system. These methods are organized into tables that are loaded into the system memory at the time the BIOS is booted. To prevent the operating system from attempting to initiate a transition to a sleep state such as hibernation (S4), the table describing the hibernate sleep state may be modified or removed from system memory to prevent successful execution of such a requested transition.

Figure 8:
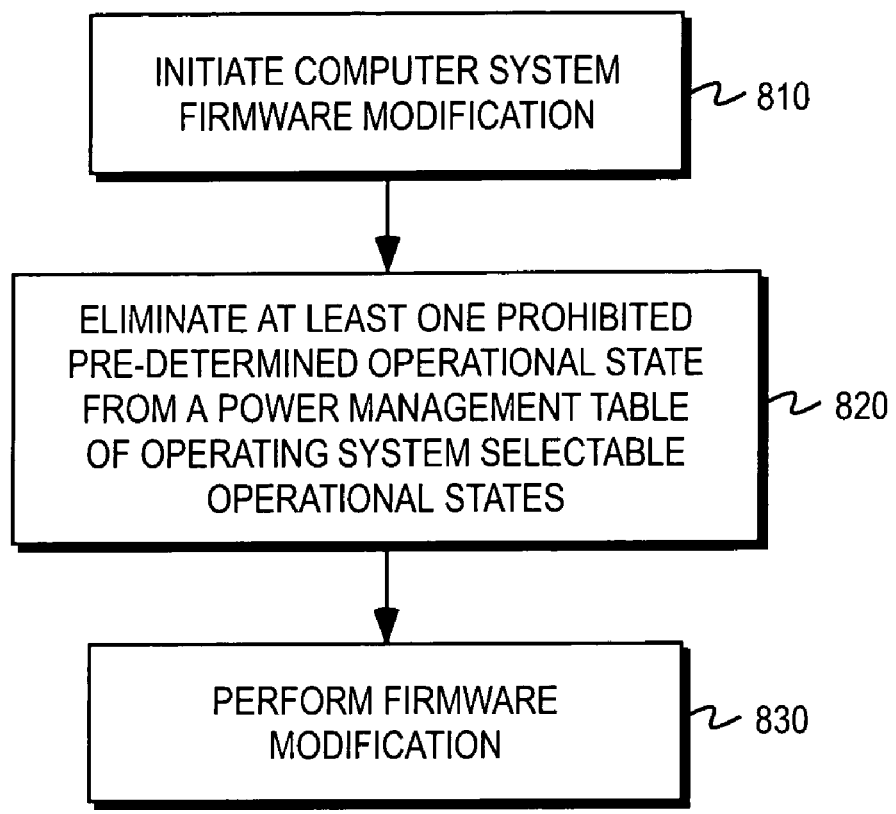
FIG. 8 illustrates one embodiment of a method of modifying firmware including elimination of at least one prohibited pre-determined operational state from operating system selectable operational states.

FIG. 8 illustrates one embodiment of a method of modifying firmware including elimination of at least one prohibited pre-determined operational state from a list of available operational states for the operating system. A computer system firmware modification is initiated at 810. A power management table is modified to prevent operating system requests for prohibited pre-determined operational states at 820. In particular, at least one prohibited pre-determined operational state is eliminated from a power management table of operating system selectable operational states.

Although the power management table may originate from the firmware, the table that is modified resides within the system memory. The operating system cannot request power management operational states that are not defined in the ACPI power management table. The firmware modification is performed at 830.

The method of FIG. 8 allows the firmware modification process to limit the power management states that the operating system can request or select. In one embodiment, for example, the S3 and S4 power management states are identified as prohibited pre-determined states. Thus the ACPI routines cannot choose from among these states when determining which of a plurality of power management states should be entered into. At the same time, however, not all power management states are prohibited. For example, disk drives or monitors may be placed into a low power state without placing the system as a whole into one of the pre-determined states.

Figure 9:
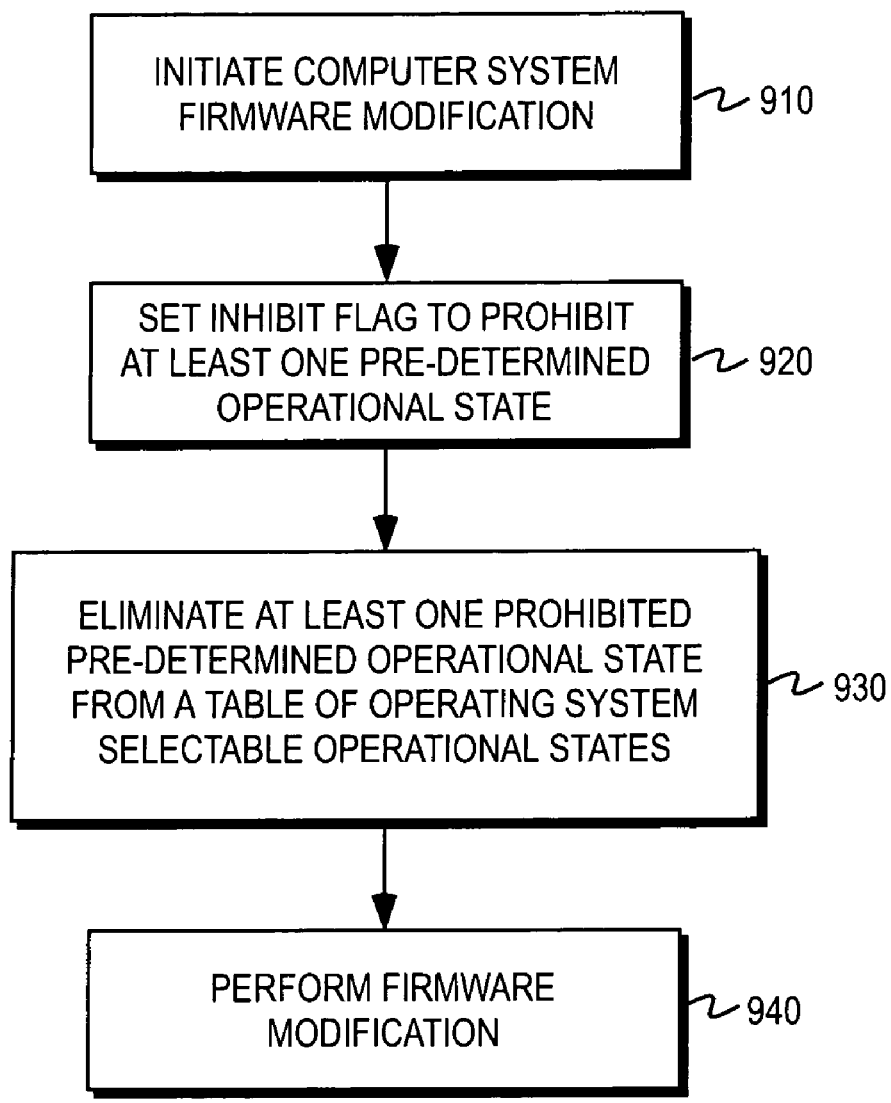
FIG. 9 illustrates one embodiment of a method for modifying firmware that thwarts operating system initiated or firmware transitions to at least one prohibited pre-determined operational state.

In one embodiment, entry into the pre-determined operational states is inhibited from both the firmware and operating system sides. In particular, the processes of FIGS. 5 and 8 are combined as illustrated in FIG. 9 to thwart transitions to at least one prohibited pre-determined state that might be initiated by the firmware or the operating system.

A computer system firmware modification is initiated at 910. An inhibit flag is set at 920 to prohibit at least one pre-determined operational state. At least one prohibited pre-determined operational state is eliminated from a table of operating system selectable operational states at 930. The operating system cannot request or transition to operational states that are not defined in the ACPI tables. The firmware modification is performed at 940.

Figure 10:
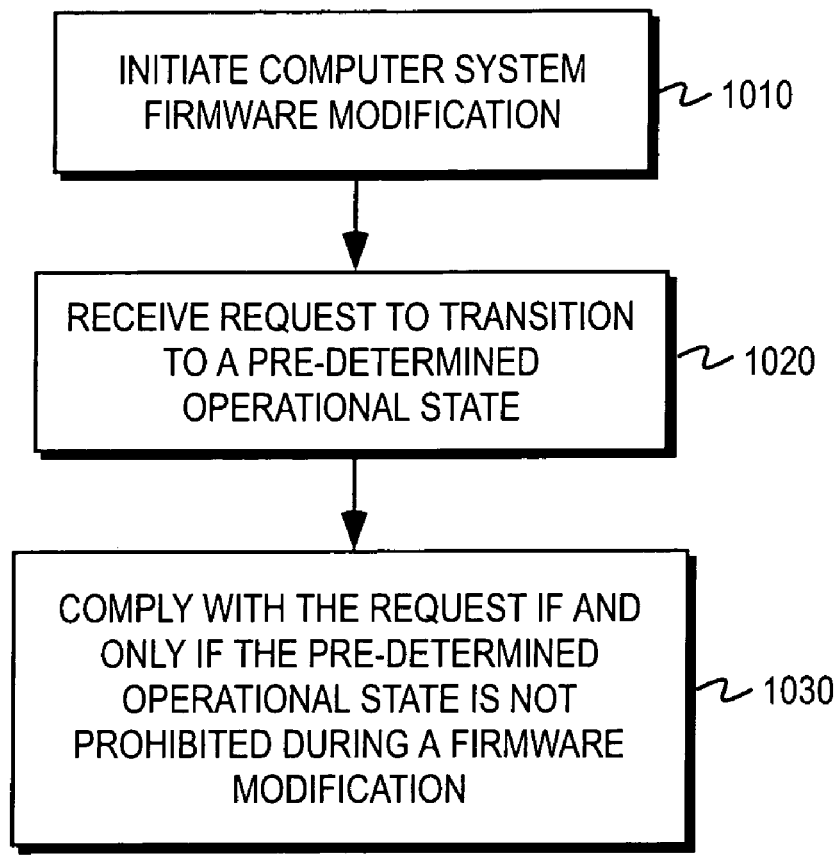
FIG. 10 illustrates one embodiment of a method of handling requests to transition to a pre-determined operating system state.

FIG. 10 illustrates one embodiment of a method of handling requests to transition to a pre-determined operating system state. A firmware modification is initiated at 1010. A request to enter a pre-determined operational state is received at 1020. The request is complied with if and only if the pre-determined operational state is not prohibited during a firmware modification at 1030.

Generally any operational state that stores a processor cache, processor context, or system memory for subsequent restoration and which performs a firmware boot, an operating system boot, or both when transitioning to that state from the current state is a prohibited operational state. Thus prohibited operational states preserve at least one of the following in whole or part for subsequent restoration: a processor context, processor cache, and system memory. A nonexclusive list of techniques for identifying prohibited pre-determined operational states to the computer system includes setting inhibit flags, communicating such states to the operating system, configuring hardware of the computer system, and modifying tables identifying selectable operational states. After the firmware is modified, the user is typically prompted to restart the computer. However, the specific process is operating system and platform specific. Some computer system configurations may automatically initiate a boot upon completion of the firmware modification, assuming no other process has intervened. Once an appropriate boot has been initiated, the inhibit flag or other mechanism utilized to inhibit selected operational states may be reset to enable the previously prohibited operational states.

Figure 11:
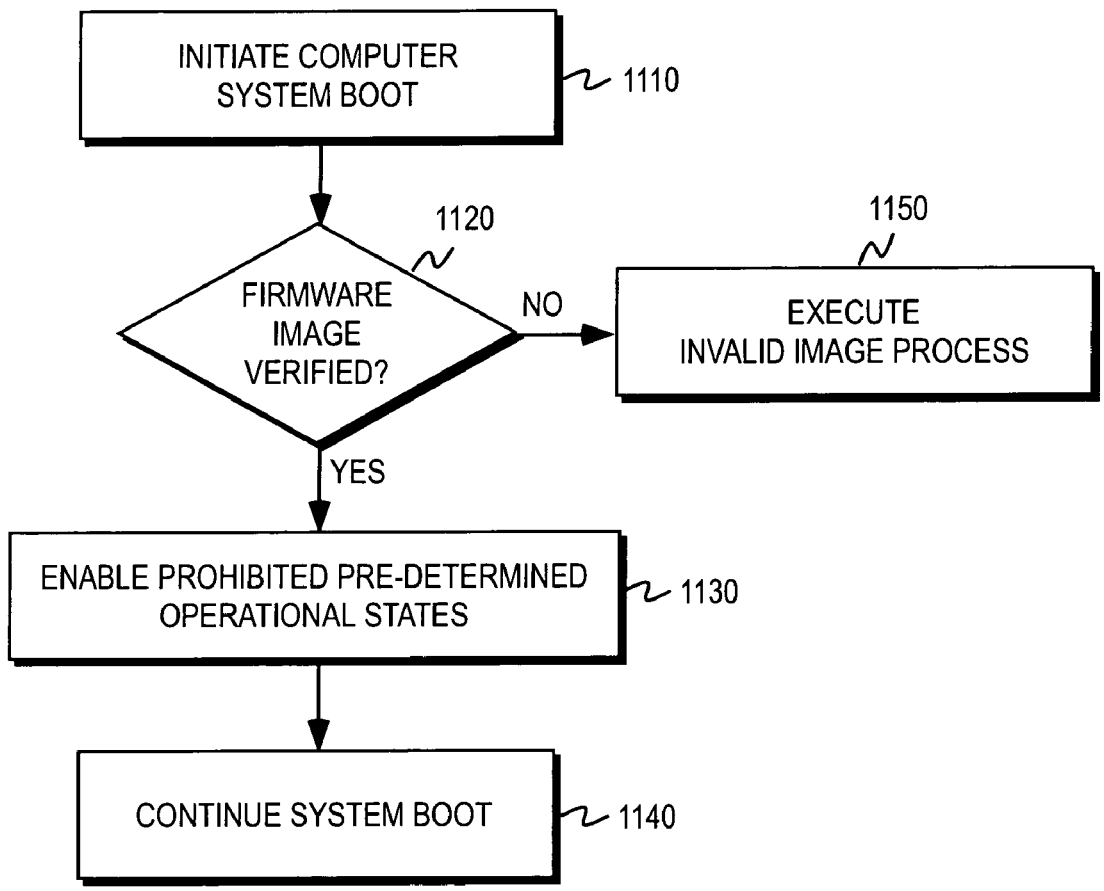
FIG. 11 illustrates one embodiment of a process for enabling operational states after a computer system boot.

FIG. 11 illustrates one embodiment of a process for enabling operational states after a computer system boot. A computer system boot is initiated at 1110. In one embodiment, the firmware image is verified at 1120 prior to enabling operational states. If the image is invalid, then an invalid image process is executed at 1150. Otherwise, the prohibited pre-determined operational states are enabled at 1130. The system boot process continues at 1140.

The method of enabling the pre-determined operational states may depend at least in part on the method used to inhibit those states and the type of boot process performed upon completion of the firmware modification. For example, inhibit flags may need to be cleared if they reside in nonvolatile memory or memory that was preserved across the boot.

If a power management table was modified to eliminate selectable options for the operating system, no subsequent action may be required after a boot. The table will simply be rebuilt during the boot process.

If the prohibited pre-determined operational states were identified by sending a message to the operating system in a previous boot session, then no subsequent action may be required to enable the previously prohibited pre-determined operational states. A boot eliminates the effect of such a message and no action is required to address the effect of a message issued prior to the boot.

Figure 12:
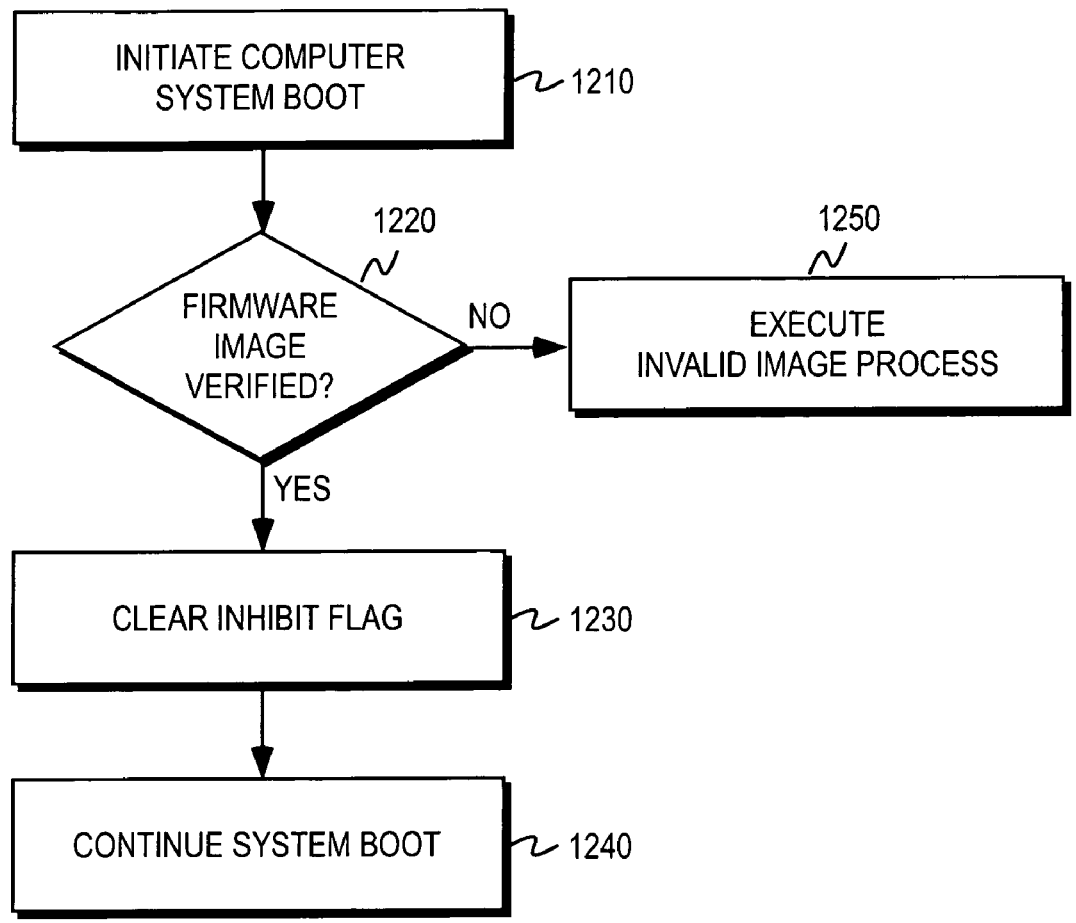
FIG. 12 illustrates one embodiment of a process for enabling operational states after a computer system boot that is specific to the use of an inhibit flag.

FIG. 12 illustrates one embodiment of a process for enabling operational states after a computer system boot that is specific to the use of an inhibit flag. A computer system boot is initiated at 1210. In one embodiment, the firmware image is verified at 1220 prior to enabling operational states. If the image is invalid, then an invalid image process is executed at 1250. Otherwise, the pre-determined operational states are enabled at 1230. This is accomplished by clearing the inhibit flag corresponding to the prohibited pre-determined operational states. The system boot process continues at 1240.

With respect to initiation of the computer system boot, such a boot refers to both an operating system and firmware boot. Although the firmware modification process does not need to necessarily conclude with a power-up boot that entails actual removal and re-application of power, care must be taken to ensure that the various hardware components are appropriately reset or initialized to avoid anomalous behavior as a result of lingering artifacts associated with a different version of the firmware. In one embodiment, this does not require transition to a power off or quasi-power off state (e.g., G3, G2). A suitable boot can be accomplished through selection of an appropriate boot vector and performing a soft boot. In one embodiment, this is a boot that results in execution of POST instructions and resetting all hardware (e.g., blocks 304 and 310 of FIG. 3).

Some systems search for a "signature" placed in system memory upon a successful boot. If the signature exists at the time of the POST, the processor can determine that a POST has already been performed since the last power-on and thus the computer is not performing a power-up boot. In one embodiment, the method of FIG. 8 will not clear the inhibit flag if the POST signature is present in the system memory. If a signature is present in the system memory, the computer system is not transitioning from an appropriate operational state such as power off, G3.

In the preceding detailed description, embodiments of the invention are described with reference to specific exemplary embodiments thereof. Various modifications and changes may be made thereto without departing from the broader scope of the invention as set forth in the claims. The specification and drawings are, accordingly, to be regarded in an illustrative rather than a restrictive sense.

What is claimed is:

1. A method of performing firmware modification, comprising:
    a) initiating a firmware modification of a firmware of a computer system, wherein the firmware is an interface between an operating system and hardware of the computer system;
    b) inhibiting at least one pre-determined operational state comprising a sleeping state until completion of a subsequent boot comprising a hardware reset of the computer system; and
    c) proceeding with the firmware modification.

2. The method of claim 1 wherein b) comprises setting an inhibit flag representing at least one prohibited pre-determined operational state, and wherein the firmware comprises a basic input/output system (BIOS).

3. The method of claim 2 wherein the inhibit flag is stored within a same nonvolatile memory storing the firmware, and wherein the hardware comprises peripheral devices of the computer system.

4. The method of claim 2 further comprising:
    d) receiving a request for the at least one pre-determined operational state; and
    e) denying the request if the inhibit flag is set.

5. The method of claim 1 wherein b) comprises identifying at least one prohibited pre-determined operational state to the operating system of the computer system.

6. The method of claim 1 further comprising:
    d) booting the computer system to reset hardware of the computer system; and
    e) enabling the at least one pre-determined operational state.

7. The method of claim 6 wherein d) comprises performing a power-up boot.

8. The method of claim 7 wherein the power-up boot does not include removal and re-application of power to the computer system.

9. The method of claim 6 wherein e) comprises clearing an inhibit flag representing at least one prohibited pre-determined operational state.

10. A method of performing firmware modification, comprising:
    a) initiating a firmware modification of firmware comprising a basic input/output system (BIOS) of a computer system;

b) eliminating at least one pre-determined operational state comprising a sleeping state from a list of available operational states for the operating system, until completion of a subsequent cold boot of the computer system; and c) proceeding with the firmware modification.

11. The method of claim 10 wherein b) comprises modifying a power management table stored in a system memory comprising random access memory (RAM) of the computer system.

12. A method of performing firmware modification, comprising:

a) initiating a firmware modification of firmware of a computer system, wherein in a power-up boot of the computer system, the firmware is configured to execute prior to loading of an operating system;

b) setting an inhibit flag representing at least one prohibited pre-determined operational state comprising a sleeping state;

c) eliminating the at least one prohibited pre-determined operational state comprising the sleeping state from a table of operating system selectable operational states until completion of a subsequent power-up boot of the computer system; and d) proceeding with modification of the firmware.

13. The method of claim 12 wherein the inhibit flag is stored within a same nonvolatile memory storing the firmware, and wherein the firmware is configured to transfer control during the power-up boot from the firmware to the operating system.

14. The method of claim 12 wherein c) comprises modifying a power management table stored in a system memory comprising volatile memory of the computer system.

15. The method of claim 12 further comprising:

e) receiving a request for the at least one prohibited pre-determined operational state; and f) denying the request because the inhibit flag is set.

16. The method of claim 12 further comprising:

e) booting the computer system, the booting comprising performing a power-up boot; and f) clearing the inhibit flag.

17. The method of claim 16 wherein the power-up boot does not include removal and re-application of power to the computer system.

18. A method of modifying a computer system firmware wherein the firmware comprises an input/output system and not an operating system of the computer system, comprising:

a) initiating a firmware modification of a firmware of a computer system;

b) receiving prior to a subsequent hard boot of the computer system a request to enter a pre-determined operational state comprising a sleeping state including at least one of a sleep state, a standby state, or a hibernate state; and c) complying with the request if and only if the pre-determined operational state is not prohibited due to a firmware modification.

19. The method of claim 18 wherein an inhibit flag is set to identify prohibited pre-determined operational states.

20. The method of claim 19 wherein the inhibit flag is located within a same physical memory storing the firmware.

21. The method of claim 18 wherein a prohibited pre-determined operational state is any state which preserves at least one of the following in whole or part for subsequent restoration: a processor context, a processor cache, or a system memory comprising volatile memory.

* * * * *